(12) United States Patent
Bishop et al.

(10) Patent No.: US 11,210,603 B2
(45) Date of Patent: *Dec. 28, 2021

(54) DEBUGGING QUANTUM CIRCUITS BY CIRCUIT REWRITING

(71) Applicant: International Business Machines Corporation, Armonk, NY (US)

(72) Inventors: Lev Samuel Bishop, Dobbs Ferry, NY (US); Andrew Cross, Yorktown Heights, NY (US); Jay Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/781,054

(22) Filed: Feb. 4, 2020

(65) Prior Publication Data

US 2020/0175414 A1 Jun. 4, 2020

Related U.S. Application Data

(63) Continuation of application No. 15/720,814, filed on Sep. 29, 2017, now Pat. No. 10,614,371.

(51) Int. Cl.
*G06F 21/00* (2013.01)
*G06N 10/00* (2019.01)
*G06F 12/14* (2006.01)

(52) U.S. Cl.
CPC ......... *G06N 10/00* (2019.01); *G06F 12/1416* (2013.01)

(58) Field of Classification Search
None
See application file for complete search history.

(56) References Cited

U.S. PATENT DOCUMENTS

| 7,376,547 | B2 | 5/2008 | Meredith | |
|---|---|---|---|---|
| 9,858,531 | B1 * | 1/2018 | Monroe | ............... G06N 10/00 |
| 10,352,992 | B1 * | 7/2019 | Zeng | .................... G06N 10/00 |
| 10,565,514 | B2 * | 2/2020 | La Cour | ................ G06F 30/20 |
| 2005/0182614 | A1 | 8/2005 | Meredith | |
| 2005/0184284 | A1 * | 8/2005 | Burkard | ................ B82Y 10/00 |
| | | | | 257/14 |

(Continued)

OTHER PUBLICATIONS

Non-Final Office Action received for U.S. Appl. No. 15/720,814 dated Jun. 26, 2019, 50 pages.

(Continued)

*Primary Examiner* — Maung T Lwin
(74) *Attorney, Agent, or Firm* — Amin, Turocy & Watson, LLP

(57) ABSTRACT

Techniques for automating quantum circuit debugging are provided that simulate standard debugging behaviors. The technology includes rewriting a source quantum circuit into instrumented circuits based on instrumentation instruction information inserted into software code that corresponds to the source quantum circuit. The instrumented circuits can be executed to obtain measurement data corresponding to different state data of qubits within the source quantum circuit. The measurement data can be processed to output generated information corresponding to one or more internal states or processes of a quantum computer associated with the source quantum circuit.

20 Claims, 12 Drawing Sheets

(56) References Cited

U.S. PATENT DOCUMENTS

| | | | | |
|---|---|---|---|---|
| 2008/0237579 A1* | 10/2008 | Barker | .................. | G06N 10/00 257/30 |
| 2010/0251049 A1 | 9/2010 | Goto et al. | | |
| 2011/0238378 A1 | 9/2011 | Allen et al. | | |
| 2015/0269124 A1* | 9/2015 | Hamze | .................. | G06N 20/00 703/2 |
| 2016/0071021 A1* | 3/2016 | Raymond | .............. | G06N 10/00 712/28 |
| 2016/0156356 A1* | 6/2016 | Bronn | .................. | B82Y 10/00 326/5 |
| 2016/0328253 A1 | 11/2016 | Majumdar | | |
| 2017/0228483 A1 | 8/2017 | Rigetti et al. | | |
| 2017/0286858 A1* | 10/2017 | La Cour | .................. | G06F 7/50 |
| 2018/0046933 A1 | 2/2018 | La Cour et al. | | |
| 2018/0181685 A1* | 6/2018 | Roetteler | ................ | G06N 10/00 |
| 2018/0336015 A1 | 11/2018 | Roetteler et al. | | |
| 2018/0349605 A1 | 12/2018 | Wiebe et al. | | |
| 2019/0013065 A1* | 1/2019 | Przybysz | ............... | G06N 10/00 |

OTHER PUBLICATIONS

Notice of Allowance received for U.S. Appl. No. 15/720,814 dated Nov. 6, 2019, 35 pages.
Notice of Reasons for Refusal for Japanese Patent Application No. 2020-517092 dated Jul. 29, 2021, 6 pages.
"Frisch, IBM Q Quantum Computing," IBM Systems for Cognitive Solutions—Ehningen—Jul. 12, 2017, https://www-01.ibm.com/events/wwe/grp/grp308.nsf/vLookupPDFs/07%20Quantum%20Computing%20cognitive%20event/5file/07%20Quantum 20Computing%20cognitive%20event.pdf, 32 pages.
IBM, "IBM Makes Quantum Computing Available on IBM Cloud to Accelerate Innovation," News Room, News Releases, https://www-03.IBM.com/press/us/en/pressrelease/49661.wss, May 4, 2016, 4 pages, Yorktown Heights, N.Y.
International Search Report and Written Opinion for International Application Serial No. PCT/EP2017/081429 dated Jun. 20, 2018, 19 pages.
Steiger, et al., "ProjectQ: An Open Source Soilware Framework for Quantum Computing," arXiv:1612 08091v1 [quant-ph]Dec. 23, 2016, XP080742759, 11 pages.
Pogorelov, et al., "Experimental adaptive process tomography," arXiv: 1611.01064v1 [quant-ph]Nov. 3, 2016, XP080729176, 12 pages.
Granade, et al., "Practical adaptive quantum tomography," arXiv: 1605.05039v1 [quant-ph]May 17, 2016, XP080701569, 14 pages.
Li, et al., "Debugging Quantum Processes Using Monitoring Measurements," arXiv:1403.4344v1 [quant-ph]Mar. 18, 2014, XP055483055, 7 pages.
Wendin, "Quantum information processing with superconducting circuits: a review," arXiv: 1610.02208v1 [quant-ph] 7 Det 2016, XP880815158, 94 pages.
Straupe, "Adaptive quantum tomography," arXiv: 1610.02840v1 [quant-ph]Oct. 10, 2016, XP836117862, 12 pages.

* cited by examiner

DEBUGGING QUANTUM CIRCUITS BY CIRCUIT REWRITING

BACKGROUND

The subject disclosure relates to quantum computing, and more specifically, to debugging quantum circuits. Standard debugging methods such as observing the internal state of a conventional computing machine while single-stepping through code execution are not possible on a quantum computer because measurement of an internal state changes the execution outcome and is an irreversible process.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products facilitating automating quantum circuit debugging are described.

According to an embodiment, a system can comprise a circuit rewriting component that rewrites a source circuit of a quantum computer into instrumented circuits based on instrumentation instruction information associated with software code corresponding to the source circuit. An execution component can execute the instrumented circuits to produce measurement data. The circuit rewriting component can apply circuit rewriting rules to remove dead code that results from the instrumentation instruction information. In an aspect, the measurement data produced by the system can provide debugged and/or improved quantum circuits.

According to another embodiment, a computer-implemented method is provided. The computer-implemented method can comprise automatically rewriting, by a system operatively coupled to a processor, a source quantum circuit into instrumented circuits based on instrumentation instruction information that instruments the source quantum circuit, wherein the source quantum circuit is associated with a quantum computer. Furthermore, the computer-implemented method can comprise executing, by a device, the instrumented circuits to obtain measurement data corresponding to different locations in the source circuit, and outputting, by the device, the measurement data. In an aspect, the measurement data produced by the computer-implemented method can provide debugged and/or improved quantum circuits.

According to yet another embodiment, a computer program product facilitating quantum circuit debugging can comprise a computer-readable storage medium having program instructions embodied therewith. The program instructions can be executable by a processor and cause the processor to automatically rewrite a source quantum circuit into instrumented circuits based on instrumentation instruction information inserted into software code that corresponds to the source quantum circuit, execute the instrumented circuits to obtain measurement data corresponding to different state data of qubits within the source quantum circuit, and process the measurement data to output generated information corresponding to one or more internal states or processes of a quantum computer associated with the source quantum circuit. In an aspect, the generated information produced by the computer program product can provide debugged and/or improved quantum circuits.

In another embodiment, a computer-implemented method can comprise rewriting a source quantum circuit into instrumented circuits based on instrumentation instruction information inserted into software code that corresponds to the source quantum circuit, executing the instrumented circuits to obtain measurement data corresponding to different state data of qubits within the source quantum circuit; and processing the measurement data to output generated information corresponding to one or more internal states or processes of a quantum computer associated with the source quantum circuit. Processing the measurement data can comprise performing state tomography and reconstruction, or performing process tomography and reconstruction. In an aspect, the generated information produced by the computer-implemented method can provide debugged and/or improved quantum circuits.

In yet another embodiment, a system can comprise a circuit rewriting component that rewrites a source quantum circuit into instrumented circuits based on instrumentation instruction information inserted into software code that corresponds to the source quantum circuit. An execution component can execute the instrumented circuits to obtain measurement data corresponding to different state data of qubits within the source quantum circuit. A statistical estimation component that processes the measurement data to output generated information corresponding to one or more internal states or processes of a quantum computer associated with the source quantum circuit. In an aspect, the generated information produced by the system can provide debugged and/or improved quantum circuits.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing employs quantum physics to encode information, in contrast to binary digital techniques based on transistors. For example, a quantum computer can employ quantum bits (e.g., qubits), which are basic units of quantum information. Qubits operate according to a superposition principle of quantum physics and an entanglement principle of quantum physics. The superposition principle of quantum physics states that each qubit can represent both a value of "1" and a value of "0" at the same time. The entanglement principle of quantum physics states that qubits in a superposition can be correlated with each other. For instance, a state of a first value (e.g., a value of "1" or a value of "0") can depend on a state of a second value. As such, a quantum computer can employ qubits to encode information.

A known property of quantum computing is that measuring the state of a qubit or subset of qubits in a quantum computing circuit changes the outcome of the circuit, relative to the outcome if not measured. As a result, measurement of qubits is generally an irreversible process, whereby standard debugging techniques methods (such as observing the internal state of a computing machine while single-stepping through the execution of instructions) are not possible on a quantum computer.

Figure 1:
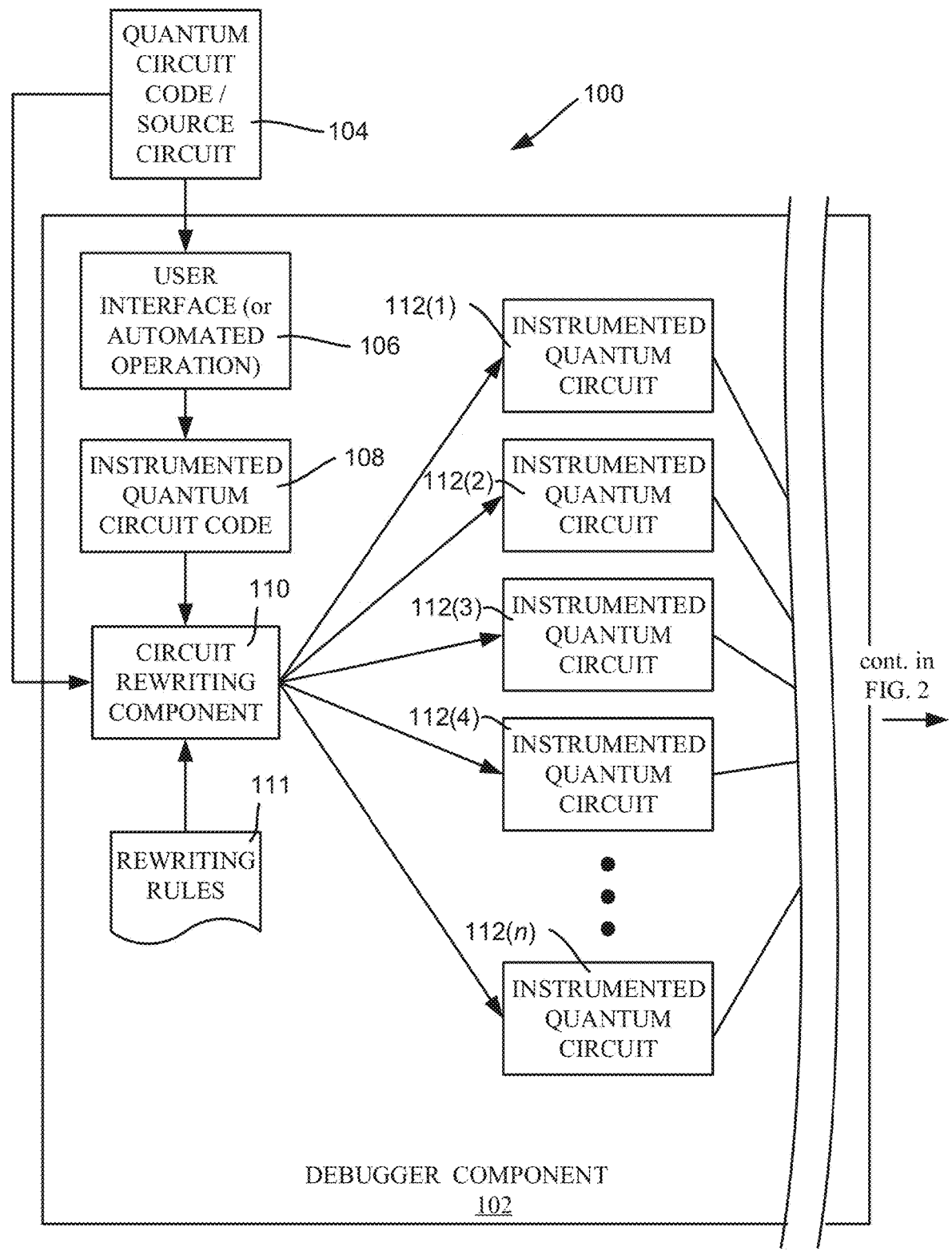
FIGS. 1-3 illustrate a block diagram of an example, non-limiting system that includes a quantum debugger component in accordance with one or more embodiments described herein.
Figure 2:
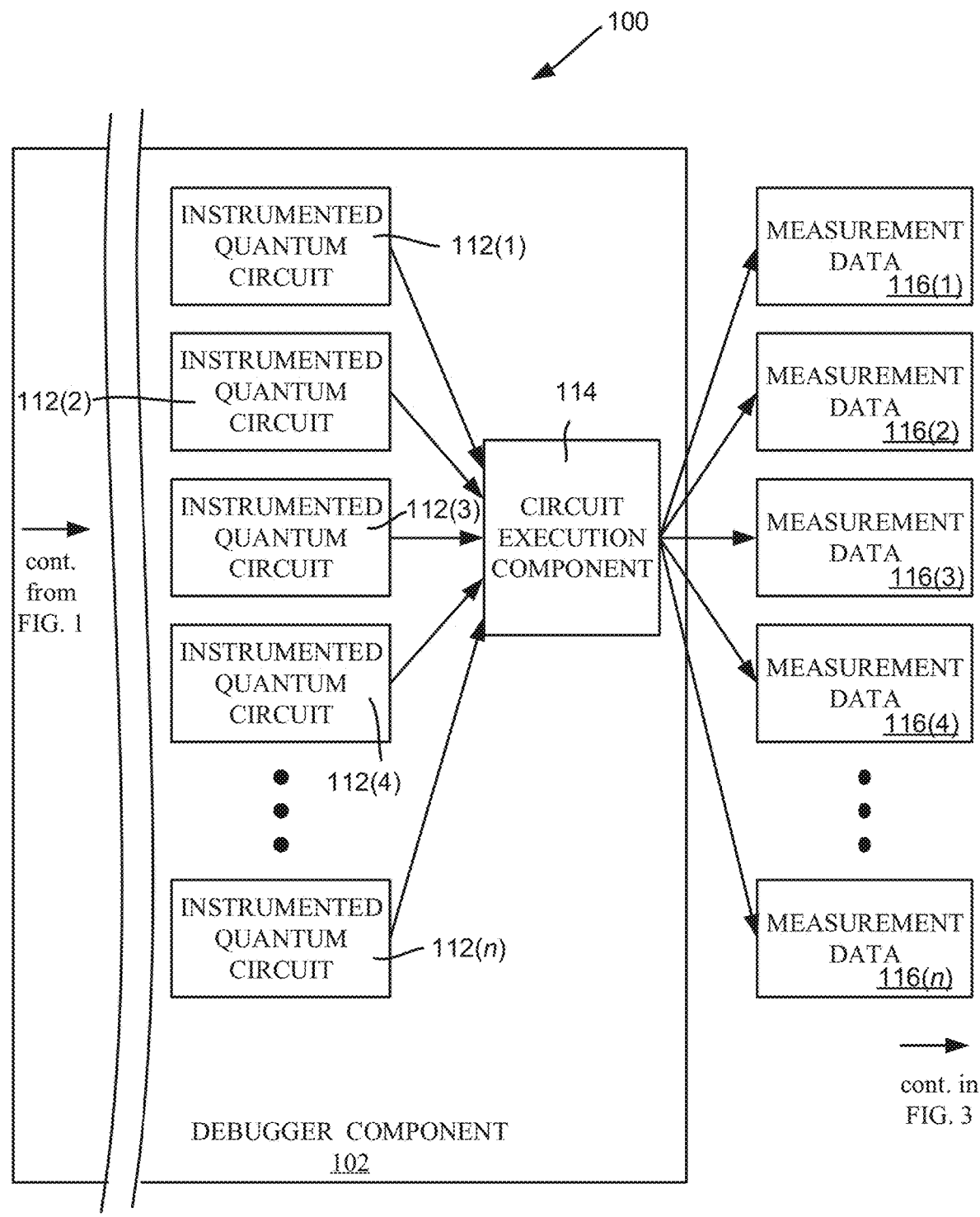
Figure 3:
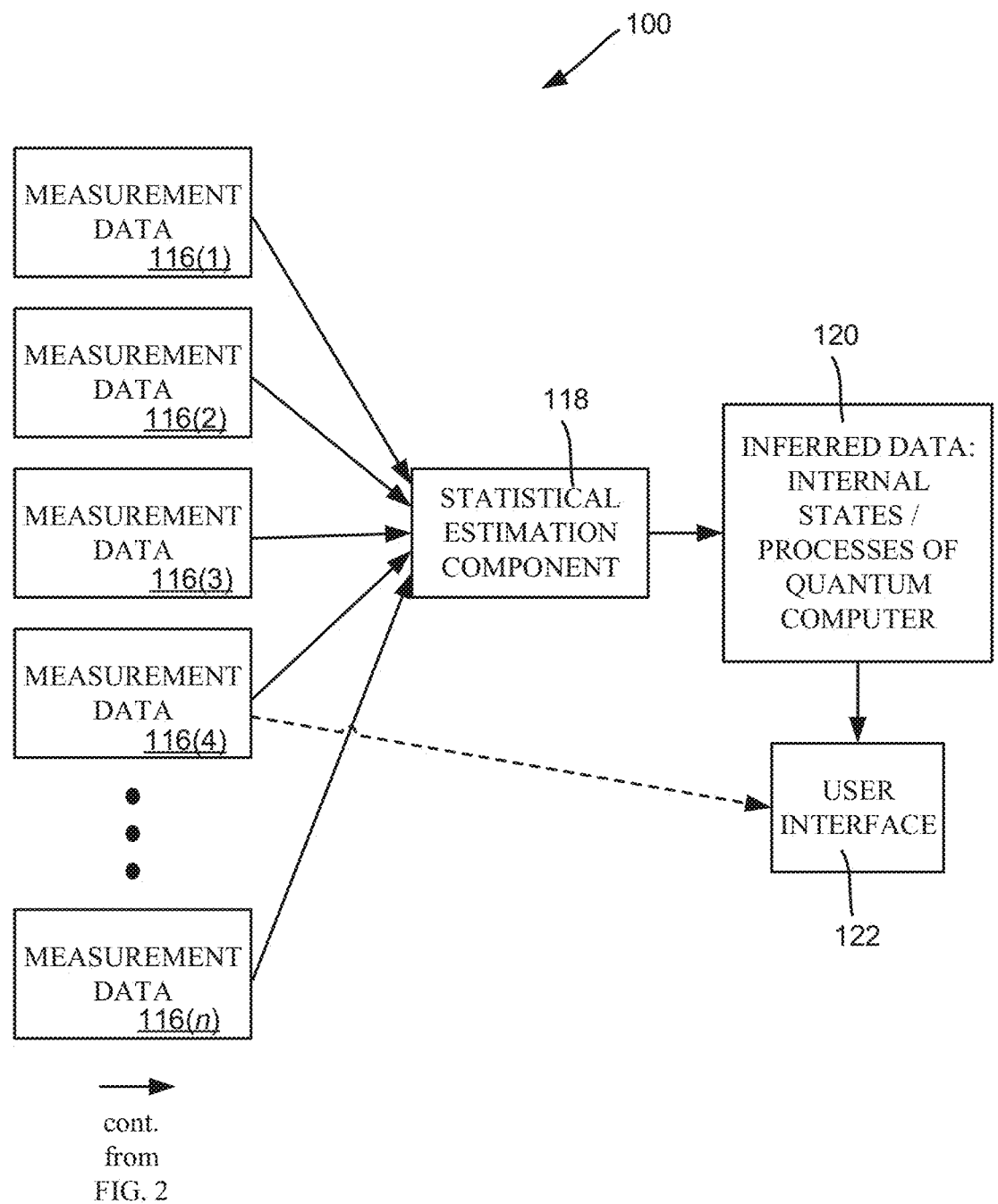

FIGS. 1-3 illustrate a block diagram of an example, non-limiting system that includes a quantum debugger component in accordance with one or more embodiments described herein. Repetitive description of like elements employed in other embodiments described herein is omitted for sake of brevity.

FIGS. 1-3 illustrate a block diagram of an example, non-limiting system 100 such as including a debugger component 102 facilitating debugging quantum circuits. Quantum circuit code 104, corresponding to a source quantum circuit (e.g., to be debugged), can be obtained as an input to the debugger component 102. A user interface 106 (or an automated process) can be used to modify the quantum circuit code 104 into instrumented quantum circuit code 108, e.g., by inserting at least one breakpoint at an appropriate location, e.g., to facilitate measuring the state of a qubit or a set of qubits at that point in the code/circuit, and/or by inserting at least one pair of beginning and ending breakpoints around a set of instructions. As is understood, in some embodiments, the user interface 106 (and/or any automated operation mechanism) can be external to the debugger component 102, such that the instrumented quantum circuit code 108 can be provided more directly as an input to the debugger component 102.

As further represented in FIG. 1, a circuit rewriting component 110 can rewrite the source circuit (based on the instrumented quantum circuit code 108 and circuit rewriting rules 111) into a plurality of instrumented quantum circuits (112(1)-112(*n*)); the instrumented quantum circuits are varied instances so as to obtain measurements at different places via the instrumented quantum circuits. In general and as described herein, circuit rewriting can insert instrumentation instructions and remove dead code that results from instrumentation.

The system 100 can employ hardware and/or software to solve problems that are highly technical in nature, including debugging quantum circuits, that are not abstract and that cannot be performed as a set of mental acts by a human. Further, in certain embodiments, some of the processes performed can be performed by one or more specialized computers (e.g., one or more specialized processing units, a specialized computer such as tomography and reconstruction, statistical estimation, and so on) for carrying out defined tasks related to machine learning. The system 100 and/or components of the system 100 can be employed to solve new problems that arise through advancements in technologies mentioned above, computer architecture, and/or the like. One or more embodiments of the system 100 can provide technical improvements to quantum circuit systems, quantum processor systems, quantum computing systems, artificial intelligence systems, and/or other systems. One or more embodiments of the system 100 can also provide technical improvements to a quantum processor (e.g., a superconducting quantum processor) by improving processing performance of the quantum processor, improving processing efficiency of the quantum processor, improving processing characteristics of the quantum processor, improving timing characteristics of the quantum processor and/or improving power efficiency of the quantum processor.

FIG. 2 represents another component of the system 100 that can be incorporated in the debugger component 102, namely a circuit execution component 114. The circuit execution component 114 can execute the instrumented quantum circuits 112(1)-112(*n*) to obtain measurement data 116(1)-116(*n*) corresponding to the individual execution operations. For example, the execution component can input one or more qubits into a gate and/or an instrumented circuit and measure the outcome at a specified measuring point, then repeat the process with a next instrumented circuit, and so on. The measurement data can be combined to infer state information regarding the source circuit.

As represented in FIG. 3, the measurement data 116(1)-116(*n*) can be processed by a statistical estimation component 118 to output inferred data 120 (e.g., the inferred internal states/inferred processes) of the quantum computer at various places in the source circuit. For example, the statistical estimation component 118 can perform well-known state tomography and reconstruction operations on the measurement data, and/or well-known process tomography and reconstruction operations. An auxiliary classical computing system (e.g., large cluster or special purpose machine) can be dedicated to processing the resulting measurement data 116(1)-116(*n*). The inferred data 120 can be output in a suitable form on a user interface instance 122, which can be part of the user interface 106 of FIG. 1. In this way, information regarding the quantum circuit code 104 (corresponding to the quantum source circuit) can be obtained as if the qubit state or the state from a correlation of qubits was actually able to be measured without changing the overall execution result.

More generally, in one or more embodiments described herein, any statistical estimation procedure that infers the internal states and/or processes of the quantum computer can be implemented by creating instrumentation circuits of an annotated input circuit (using circuit rewriting rules 111, FIG. 1), executing the instrumentation circuits, and post-processing the ensemble of measurement outcomes, e.g., using well known statistical analysis techniques, to estimate what is occurring with respect to qubit states and data at different places in the input circuit. Note further that as shown via the dashed arrow in FIG. 3 between the measurement data 116(4) and the user interface 122, statistical estimation is only an option, and a representation of the measurement data can be directly presented via the user interface 122. For example, a qubit state that is expected to be transformed by a circuit to a certain state based on a given input to that circuit can be directly evaluated to see whether the qubit is actually in the expected state at that point.

Described herein is a technology embodied in a system 100 to simulate debugging (via debugging component 102) and related operational behavior by executing an ensemble of quantum circuits, comprising instrumented circuits 112, which are derived from an annotated/instrumented source quantum circuit/code 108. As will be understood, the instrumented circuits can be produced by applying circuit rewriting rules 111 to insert instrumentation instructions. The rules 111 also can remove dead code that results from the instrumentation.

Embodiments described herein include systems, computer-implemented methods, and computer program products facilitating debugging quantum circuits by automatically rewriting quantum circuits, as illustrated via the circuit rewriting component 110. In an aspect related to single stepping through a quantum program, in instrumented software code, a breakpoint (e.g., FIG. 4) is inserted between a pair of quantum circuit instructions within software code corresponding to a source quantum circuit. The source circuit and instrumented circuit can be specified using a suitable circuit representation, embodied for example by Quantum Assembly Language (QASM) software code. The breakpoint includes a (partial) partition of the system's qubits, which can be instantiated in hardware or simulators or other mathematical models.

Using any suitable form of state tomography and reconstruction (represented as the statistical estimation component 118), the states corresponding to the qubits at different places in the source quantum circuit can be estimated. This can involve appropriate modification of sub-circuits/operations before and after a breakpoint, and replacement of these operations by pre- and post-operations facilitating the tomographic method.

In another aspect, the above concept can be applied to a set of instructions (a quantum code segment of interest) to estimate a quantum process to which those instructions apply. Beginning and ending breakpoints are inserted around the quantum code segment of interest. A (partial) partition of the qubits is given.

Using any form of process tomography and reconstruction (represented as the statistical estimation component 118, the processes corresponding to each subset of the partition are estimated. This can involve appropriate modification of sub-circuits/operations before and after a breakpoint, and replacement of these operations by pre- and post-operations facilitating the tomographic method.

Thus, whether via a single breakpoint or starting and ending breakpoints surrounding a set of instructions, by varying the circuits over combinations of gates and re-executing them, a reduced density matrix of the system (i.e., some or all of the observable system state) can be estimated for each subset of qubits in the partition, e.g., using any suitable form of state or process tomography and reconstruction. The circuit is rewritten according to rewriting rules to enable each estimation. For example, by propagating the influence of the instrumentation forwards through the circuit, the qubit(s) whose state may be causally connected to the instrumentation may be determined to remove future operations in the partition and replaced by appropriate post-rotations and measurements.

In the embodiments shown in FIGS. 1-3, the system 100 can include a debugger component 102. As shown in FIG. 1, the debugger component 102 can include a circuit rewriting component 110. Aspects of the debugger component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the debugger component 102 can also include memory that stores computer executable components and instructions. Furthermore, the debugger component 102 can include a processor to facilitate execution of the instructions (e.g., computer executable components and corresponding instructions) by the debugger component 102. As shown, the various components of the debugger 102 can be electrically and/or communicatively coupled to one another in one or more embodiments.

The debugger component 102 can receive quantum circuit data 104, 108. The quantum circuit data 104, 108 can be, for example, a machine-readable description of a quantum circuit. The quantum circuit can be a model for one or more quantum computations associated with a sequence of quantum gates. In one example, the quantum circuit data can include textual data indicative of a text-format language (e.g., a QASM text-format language) that describes a quantum circuit. For instance, the textual data can, for example, textually describe one or more qubit gates of a quantum circuit associated with one or more qubits. In an embodiment, the quantum circuit data can additionally include marker data indicative of information for one or more elements that identify one or more locations associated with a quantum circuit. For example, an element may be added to the code to tag a measurement location of one or more qubit gates of a quantum circuit associated with one or more qubits.

In certain embodiments, the debugger component 102 can generate the instrumented quantum circuit code 108 or instrumented quantum circuits 112 based on classifications, correlations, inferences and/or expressions associated with principles of artificial intelligence. For example, based on previous user behavior that is learned, one or more breakpoints can be automatically inserted (or suggested for insertion) into the code corresponding to a circuit to be debugged. Further, the debugger component 102 can employ an automatic classification system and/or an automatic classification process to determine the rewritten instrumented quantum circuits 112. In one example, the debugger component 102 can employ a probabilistic and/or statistical-based analysis (e.g., factoring into the analysis utilities and costs) to learn and/or generate inferences with respect to the set of instrumented quantum circuits, e.g., using tomography and reconstruction. In an aspect, the circuit rewriting component 110 can include an inference component (not shown) that can further enhance automated aspects of the debugger component 102 utilizing in part inference based schemes to facilitate learning and/or generating inferences associated with the set of instrumented quantum circuits 112. For example, the debugger may recognize that some part of a source circuit had previously been debugged, with the measurement and/or inference data saved, and recall that saved data to reduce the total debugging time.

The circuit rewriting component 110 can employ any suitable machine-learning based techniques, statistical-based techniques and/or probabilistic-based techniques. For example, the circuit rewriting component 110 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the debugger component 102 can perform a set of machine learning computations associated with generation of the instrumented quantum circuits 112, if such as clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

It is to be appreciated that the debugger component 102 (e.g., the circuit rewriting component 110 and/or the circuit execution component 114) can perform a circuit generation process and/or an execution process that cannot be performed by a human (e.g., is greater than the capability of a single human mind). For example, an amount of data processed, a speed of data processed and/or data types of data processed by the debugger component 102 (e.g., the circuit rewriting component 110 and/or the circuit execution component 114) over a certain period of time can be greater, faster and different than an amount, speed and data type that can be processed by a single human mind over the same period of time. In general, quantum circuit processing is too complex for a single human mind, and the number of possible states and combinations can be immense. The quantum debugger component 102 (e.g., the circuit rewriting component 110 and/or the circuit execution component 114) can also be fully operational towards performing one or more other functions while also performing the above-referenced processes. Moreover, the measurement data 116 generated by the debugger component 102 can include information that is impossible to obtain manually by a user, because the states are mostly unpredictable.

Figure 4:
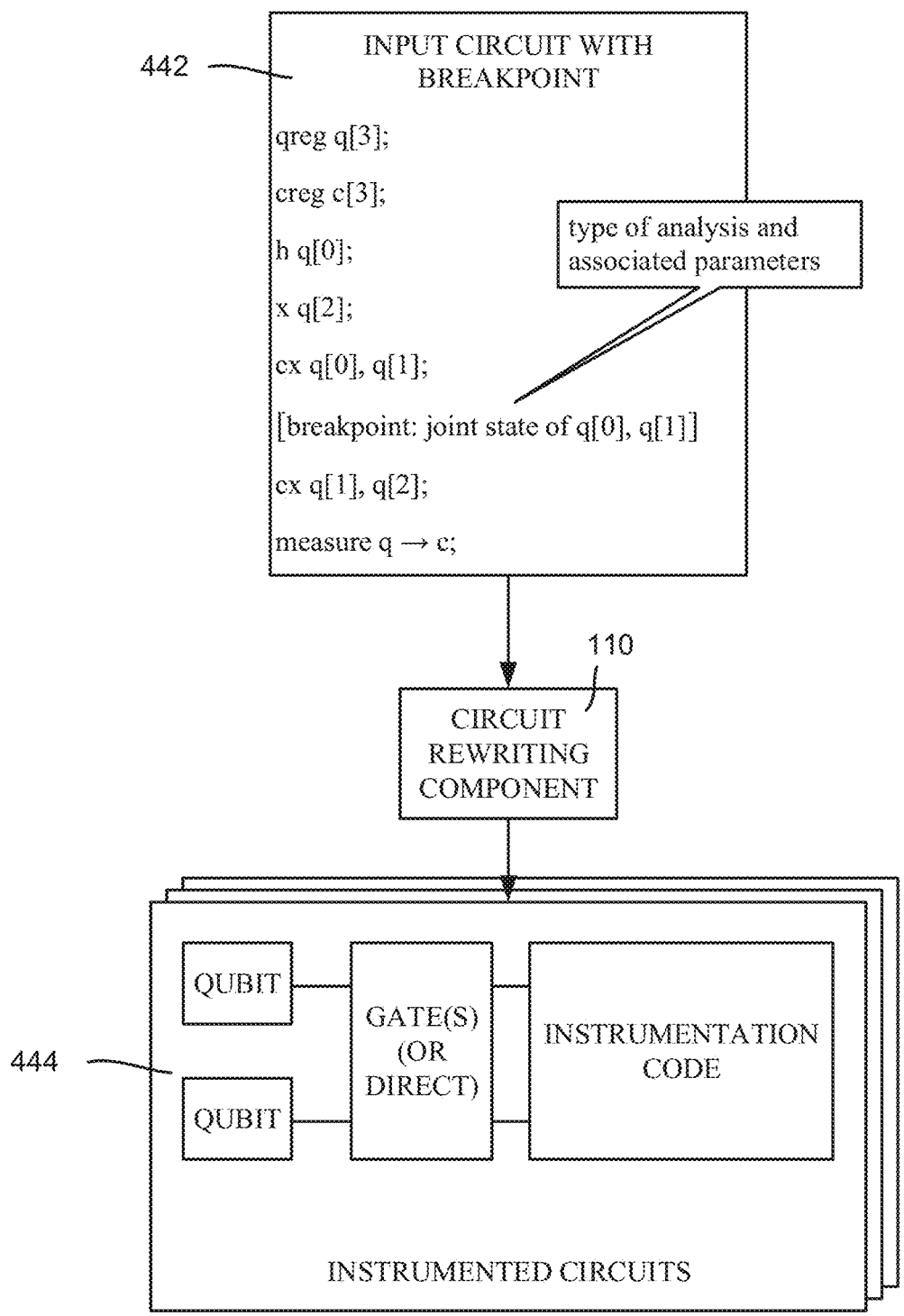
FIG. 4 illustrates a block diagram of another example, non-limiting system that includes an input circuit with breakpoint rewritten into instrumented circuit instances in accordance with one or more embodiments described herein.

FIG. 4 illustrates a block diagram of another example, non-limiting system that includes an input circuit with breakpoint rewritten into instrumented circuit instances in accordance with one or more embodiments described herein. Repetitive description of like elements employed in other embodiments described herein is omitted for sake of brevity.

FIG. 4 exemplifies the concept of rewriting, via circuit rewriting component 110, an input circuit with breakpoint (block 444) into multiple instrumented circuit instances represented by block 444. Note that the exemplified breakpoint in block 444 can specify the type of analysis to perform and any associated analysis parameters.

One or more (or, in some embodiments, each) of the instrumented circuit instances represented by block 444 input one or more qubits into rewritten instrumentation code, which can be directly or via one or more gates. The rewritten instrumentation code can vary between executable instances of the instrumented circuits.

Figure 5:
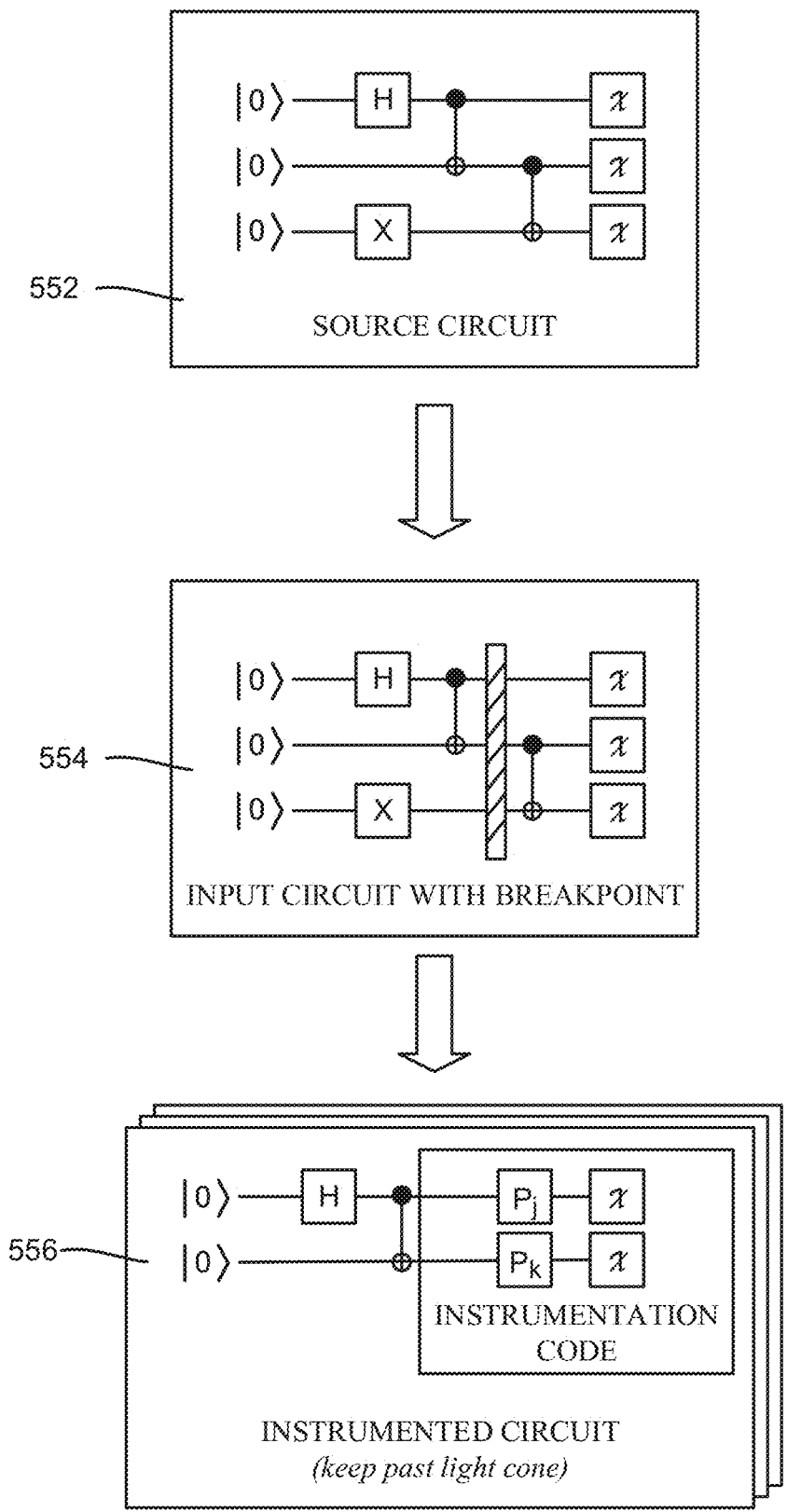
FIGS. 5 and 6 illustrate a block diagram an example, non-limiting system that rewrites instrumented circuits using an approach that determines the qubit(s) whose state may be causally connected to the instrumentation by propagating the influence of the instrumentation backwards through the circuit (e.g., relative to a breakpoint) in accordance with one or more embodiments described herein.
Figure 6:
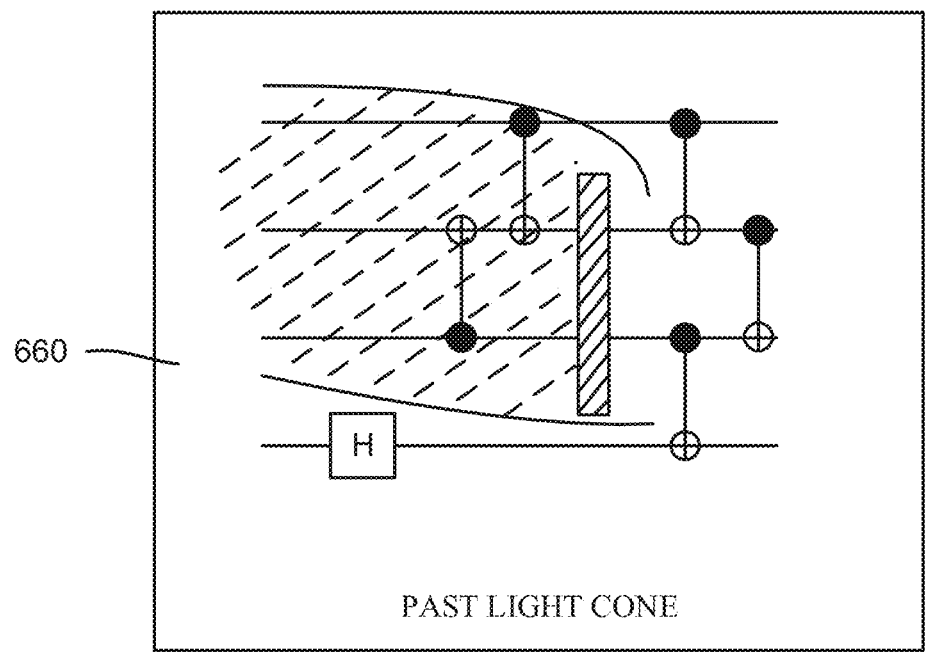

Turning to aspects related to rewriting circuits, FIGS. 5 and 6 illustrate a block diagram an example, non-limiting system that rewrites instrumented circuits using an approach that determines the qubit(s) whose state may be causally connected to the instrumentation by propagating the influence of the instrumentation backwards through the circuit (e.g., relative to a breakpoint) in accordance with one or more embodiments described herein. Repetitive description of like elements employed in other embodiments described herein is omitted for sake of brevity.

FIG. 5 exemplifies a source circuit 552 (corresponding to software) being processed into an input circuit with a breakpoint 554 based on a breakpoint inserted at a specified place in the circuit. Instrumented circuit instances 556 are rewritten with different instrumentation code for each instrumented circuit instance, e.g., by varying $P_j$ and/or $P_k$ in each instrumented circuit. For example, $P_j$, $P_k$ can be varied over all gates in {identity, X, Y, Z} resulting in sixteen instrumented circuits total. Each of these instrumented circuits is executed, resulting in measurement data at the various places in the varied circuits corresponding to the multiple gates.

As is understood, once a measurement is taken of a qubit state, the qubit state (as well as that of any correlated qubit) is no longer valid, resulting in "dead" code; (nothing can be learned by passing a measured qubit to another gate, because the measuring operation can change the qubit state relative to the qubit state if not measured, and thus the remaining code is essentially dead with respect to further measurements). Note that when qubits interact via gates, their states are no longer separable. The rewriting of the instrumented quantum circuits can factor this in and remove any dead code.

One approach to removing dead code, represented in FIG. 5, is to determine the qubit(s) whose state may be causally connected to the instrumentation by propagating the influence of the instrumentation forwards/backwards through the circuit before the breakpoint, as represented in block 660 of FIG. 6. Conceptually, this can be considered analogous to a "past light cone." For example, if the state of a qubit (or set of qubits) is measured at a gate in one instrumented circuit, the gate can be removed in a next instrumented circuit, and the measured qubit state or simulated qubit state can be input into the appropriate gate in a next instrumented circuit. This approach produces smaller circuits (relative to the alternative approach described below), but assumes that the gates act only on the intended qubits.

Figure 7:
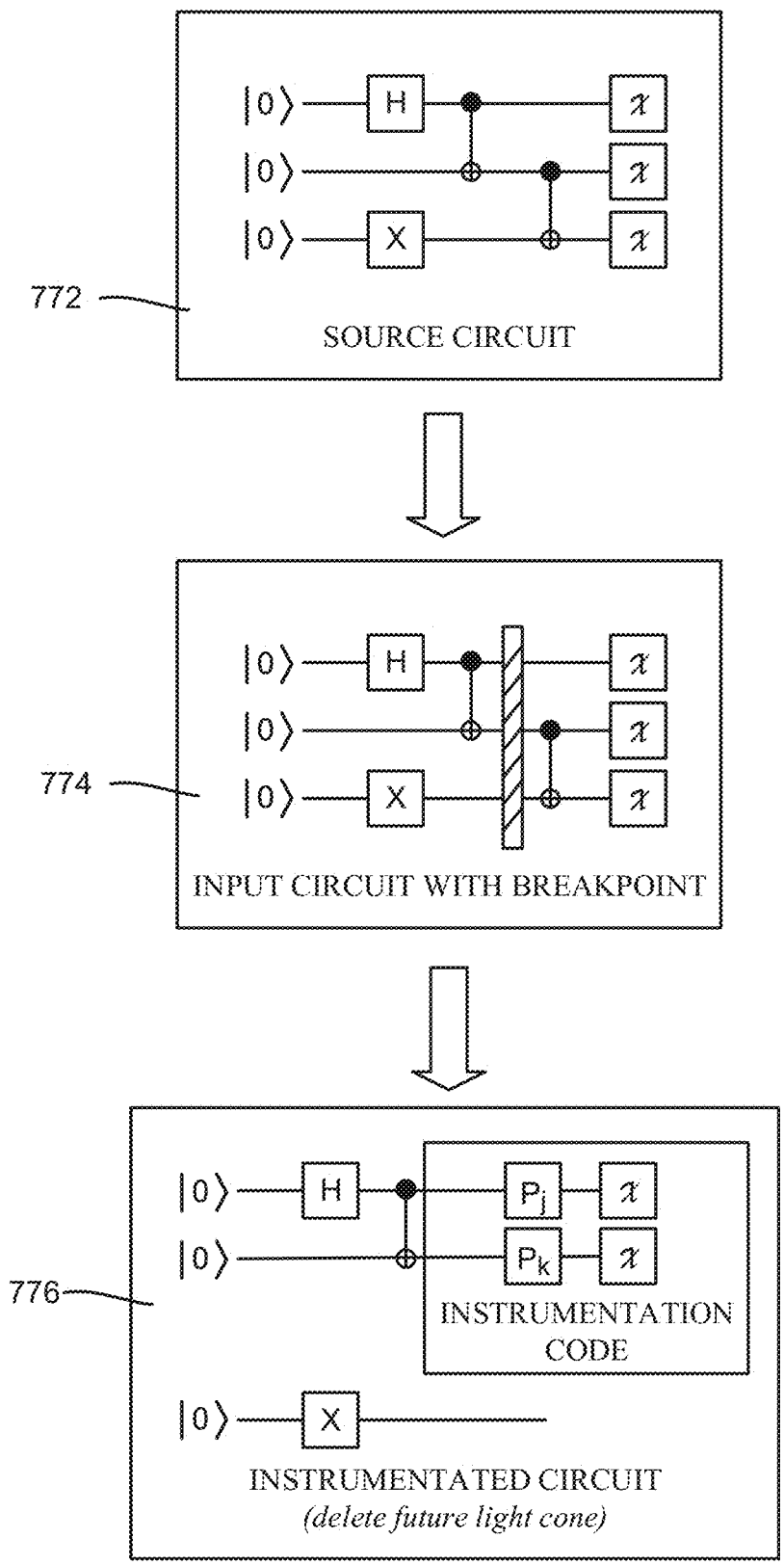
FIGS. 7 and 8 illustrate a block diagram of an example, non-limiting system that rewrites instrumented circuits using an approach that determines the qubit(s) whose state may be causally connected to the instrumentation by propagating the influence of the instrumentation forwards through the circuit (e.g., relative to a breakpoint) in accordance with one or more embodiments described herein
Figure 8:
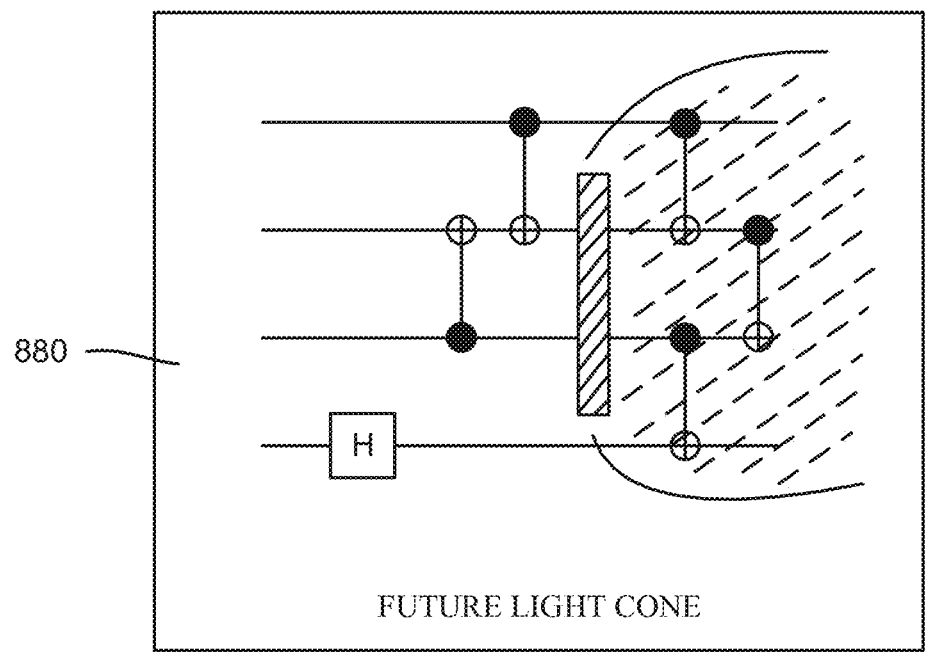

FIGS. 7 and 8 illustrate a block diagram an example, non-limiting system that rewrites instrumented circuits using an approach that determines the qubit(s) whose state may be causally connected to the instrumentation by propagating the influence of the instrumentation forwards through the circuit (e.g., relative to a breakpoint) in accordance with one or more embodiments described herein. Repetitive description of like elements employed in other embodiments described herein is omitted for sake of brevity.

The alternative approach represented in FIGS. 7 and 8 deletes future code/sub-circuits that are past the breakpoint, e.g., determining the qubit(s) whose state may be causally connected to the instrumentation by propagating the influence of the instrumentation forwards through the circuit; that is, this alternative approach deletes what is analogous to a qubit's "future light cone" (the set of possible destinations of a qubit) that is past the breakpoint. For example, once a circuit 772 is rewritten (input circuit with breakpoint 774) so that the measurement is taken based on a certain breakpoint in the rewritten circuit, no further execution is meaningful (and thus not needed) in the rest of that particular rewritten instrumented circuit instant 776 with respect to the measured qubit state/any correlated qubit. As represented by block 880 of FIG. 8, the future sub-circuits can thus be deleted, as represented by the slanted dashed lines beyond the breakpoint. The measurement point can be moved in a next rewritten instrumented circuit instance, which is executed to obtain the measurement data at that next measurement point, and so on, to obtain a full set of desired measurement data. As can be seen, in either approach, unnecessary gates (corresponding to dead code) are removed in the instrumented circuits.

Figure 9:
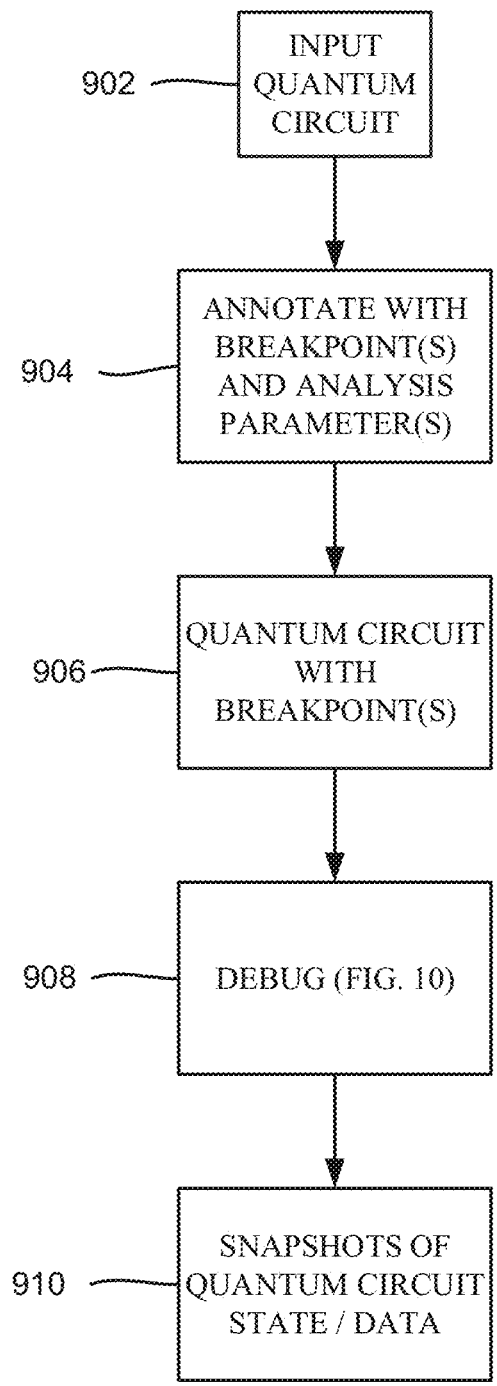
FIGS. 9 and 10 illustrate a flow diagram of an example, non-limiting computer-implemented method facilitating rewriting an annotated quantum circuit into instrumented circuits (FIG. 9) facilitating debugging (FIG. 10) in accordance with one or more embodiments described herein.
Figure 10:
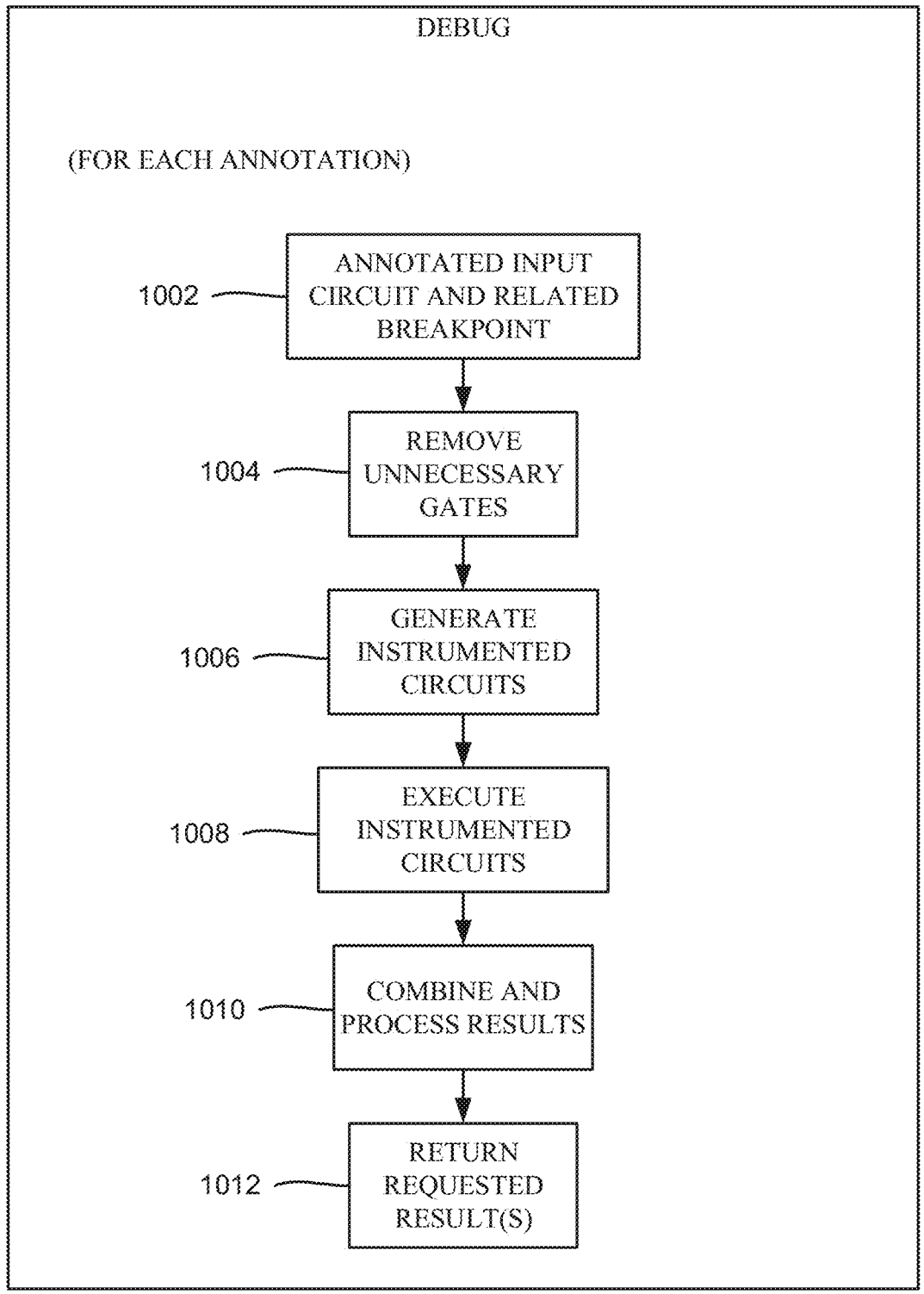

FIGS. 9 and 10 illustrate a flow diagram of an example, non-limiting computer-implemented method facilitating automating quantum circuit debugging in accordance with one or more embodiments described herein. Repetitive description of like elements employed in other embodiments described herein is omitted for sake of brevity.

At 902, a quantum circuit is input. At 904, the quantum circuit is annotated with one or more breakpoints and one or more analysis parameters, resulting in a quantum circuit with breakpoints 906. At 908, the quantum circuit is debugged, as described herein with reference to FIG. 10. The debugging provides snapshots of state and data of the quantum circuit as represented via 910.

FIG. 10 summarizes the debugging operations facilitating each annotation. At 1002, the annotated input circuit and related breakpoint is processed to remove unnecessary gates, e.g., using the approaches of propagating the influence of the instrumentation forwards/backwards as described herein. The resulting instrumented circuits are generated at 1006 and executed at 1008. At 1010, the results from the execution of the instrumented circuits are combined and processed for returning at 1012.

The processes can be automated in software in such a way that the instrumentation circuits and reconstruction software need not be viewed by a user (unless desired), creating the illusion of a standard debugging environment.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least generating the instrumented circuits, and executing the instrument circuits to obtain the measurement data, etc. are established from a combination of electrical and mechanical components and circuitry, a human is unable to replicate or perform processing performed by the quantum circuit debugger component 102.

Figure 11:
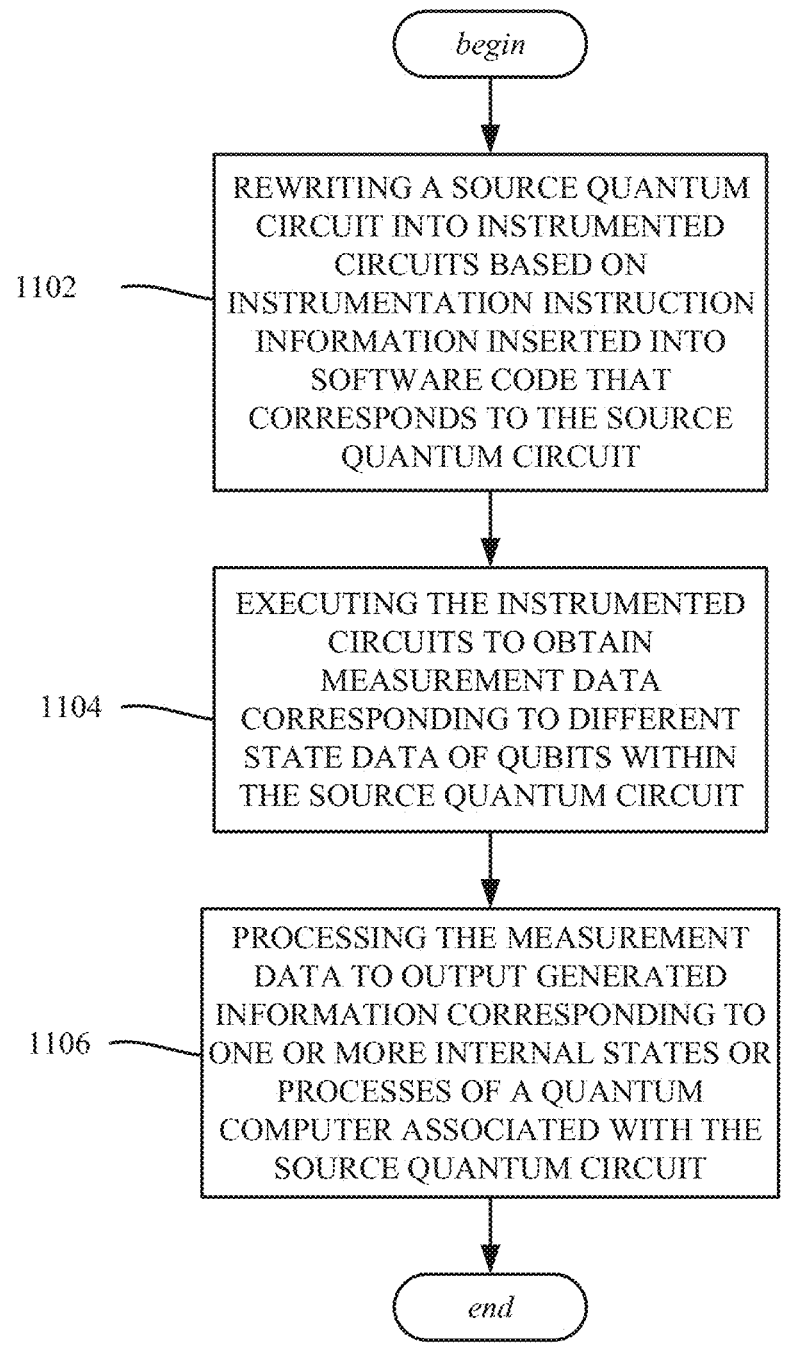
FIG. 11 illustrates a flow diagram of an example, non-limiting computer-implemented method facilitating rewriting an annotated quantum circuit into instrumented circuits, executing the instrumented circuits to provide output, and processing the output, in accordance with one or more embodiments described herein.

FIG. 11 illustrates a flow diagram of example, non-limiting computer-implemented operations facilitating debugging of a quantum circuit, including by rewriting an annotated quantum circuit into instrumented circuits, executing the instrumented circuits to provide output, and processing the output, in accordance with one or more embodiments described herein.

Operation 1102 represents rewriting a source quantum circuit into instrumented circuits based on instrumentation instruction information inserted into software code that corresponds to the source quantum circuit. Operation 1104 represents executing the instrumented circuits to obtain measurement data corresponding to different state data of qubits within the source quantum circuit. Operation 1106 represents processing the measurement data to output generated information corresponding to one or more internal states or processes of a quantum computer associated with the source quantum circuit.

Figure 12:
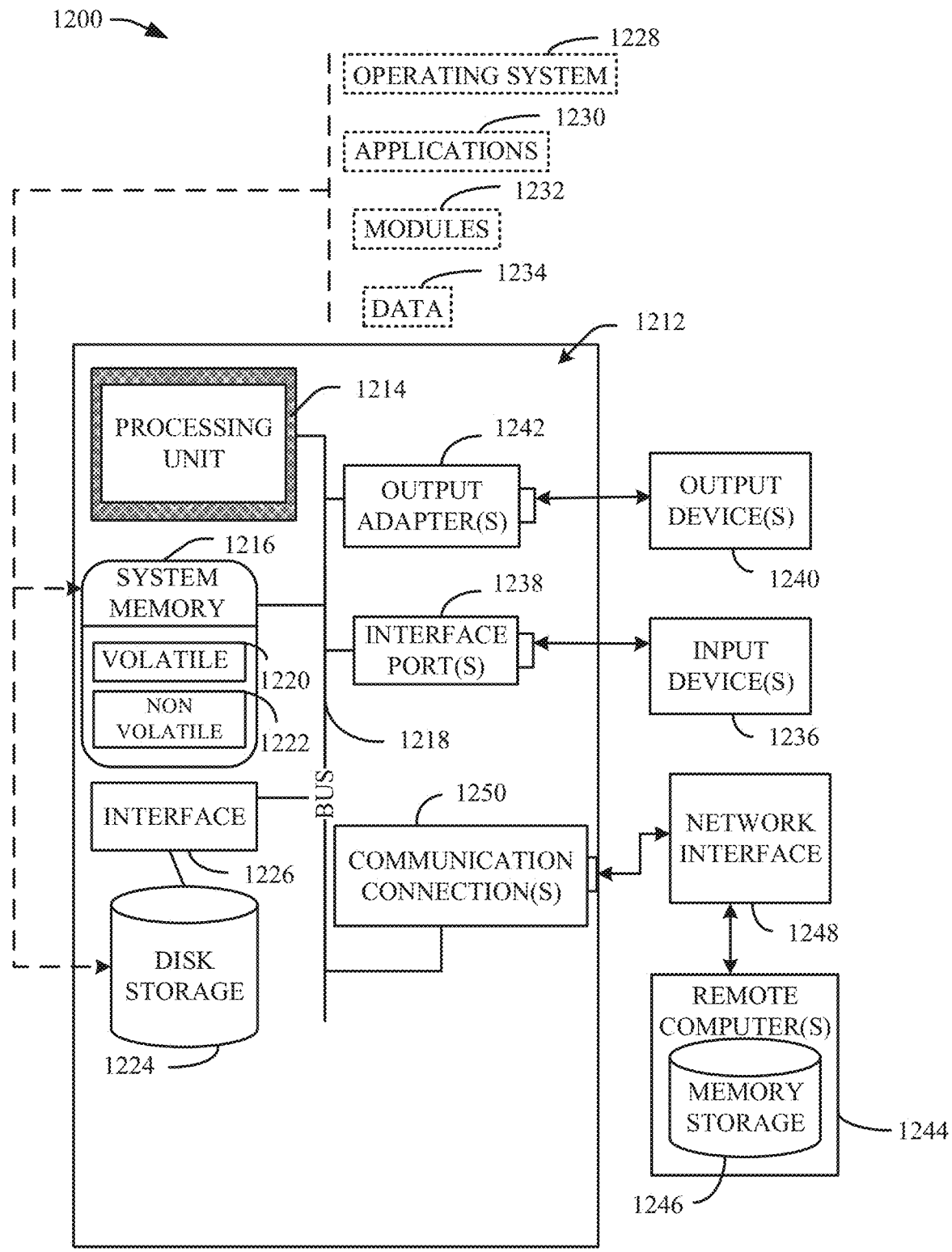
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media. To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212.

System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes the computer executable components stored in the memory, wherein the computer executable components comprise:
a circuit rewriting component that propagates instrumentation information defining one or more influences of instrumentation forwards or backwards through a source quantum circuit to identify, for a rewrite of the source quantum circuit, one or more qubits of qubits of the source quantum circuit whose state is causally connected to the instrumentation; and
an execution component that executes an instrumented circuit to produce measurement data, wherein the instrumented circuit is based on removal of one or more gates associated with the one or more qubits from the source quantum circuit.

2. The system of claim 1, wherein the circuit rewriting component applies circuit rewriting rules to the source quantum circuit based on the instrumentation information to generate the instrumented circuit.

3. The system of claim 1, wherein the circuit rewriting component employs one or more analysis parameters received via an application programming interface.

4. The system of claim 1, wherein the instrumentation information comprises a breakpoint inserted between two quantum circuit instructions in the source quantum circuit.

5. The system of claim 1, wherein the instrumentation information comprises a beginning breakpoint inserted before a quantum code segment in the source quantum circuit and an ending breakpoint inserted after the quantum code segment.

6. The system of claim 1, further comprising a statistical estimation component that evaluates the measurement data to infer information corresponding to one or more internal states or processes of the source quantum circuit.

7. The system of claim 6, wherein the statistical estimation component employs state tomography and reconstruction to evaluate the measurement data.

8. The system of claim 6, wherein the statistical estimation component employs process tomography and reconstruction to evaluate the measurement data.

9. A computer-implemented method, comprising:
propagating, by a system operatively coupled to a processor, instrumentation information defining one or more influences of instrumentation forwards or backwards through a source quantum circuit to identify, for a rewrite of the source quantum circuit, one or more qubits of the source quantum circuit whose state is causally connected to the instrumentation;
executing, by a device, an instrumented circuit to produce measurement data, wherein the instrumented circuit is based on removal of one or more gates associated with the one or more qubits from the source quantum circuit.

10. The computer-implemented method of claim 9, further comprising applying, by the system, circuit rewriting rules to the source quantum circuit based on the instrumentation information to generate the instrumented circuit.

11. The computer-implemented method of claim 9, further comprising employing, by the system, one or more analysis parameters received via an application programming interface.

12. The computer-implemented method of claim 9, wherein the instrumentation information comprises a breakpoint inserted between two quantum circuit instructions in the source quantum circuit.

13. The computer-implemented method of claim 9, wherein the instrumentation information comprises a beginning breakpoint inserted before a quantum code segment in the source quantum circuit and an ending breakpoint inserted after the quantum code segment.

14. The computer-implemented method of claim 9, further comprising evaluating, by the system, the measurement data to infer information corresponding to one or more internal states or processes of the source quantum circuit.

15. The computer-implemented method of claim 14, wherein the evaluating comprises employing state tomography and reconstruction to evaluate the measurement data.

16. The computer-implemented method of claim 14, wherein the evaluating comprises employing process tomography and reconstruction to evaluate the measurement data.

17. A computer program product facilitating debugging quantum computer software, the computer program product comprising a non-transitory computer readable storage medium having program instructions embodied therewith, the program instructions executable by a processor to cause the processor to:
propagate instrumentation information defining one or more influences of instrumentation forwards or backwards through a source quantum circuit to identify, for a rewrite of the source quantum circuit, one or more qubits of the source quantum circuit whose state is causally connected to the instrumentation;
execute an instrumented circuit to produce measurement data, wherein the instrumented circuit is based on removal of one or more gates associated with the one or more qubits from the source quantum circuit.

18. The computer program product of claim 17, wherein the program instructions are further executable by the processor to cause the processor to:
apply circuit rewriting rules based on the instrumentation information.

19. The computer program product of claim 17, wherein the program instructions are further executable by the processor to cause the processor to:
employ one or more analysis parameters received via an application programming interface.

20. The computer program product of claim 17, wherein the instrumentation information comprises a breakpoint inserted between two quantum circuit instructions in the source quantum circuit.

* * * * *